June 9, 1959 R. D. WALKER 2,890,416
COMBINATION SPRING ABUTMENT AND POINTER-SECURING
MEANS FOR ELECTRICAL INSTRUMENTS
Filed Nov. 25, 1955

ROBERT D. WALKER
INVENTOR.

BY
Rudolph J. Jurick
ATTORNEY

United States Patent Office 2,890,416
Patented June 9, 1959

2,890,416

COMBINATION SPRING ABUTMENT AND POINTER-SECURING MEANS FOR ELECTRICAL INSTRUMENTS

Robert D. Walker, Newark, N.J., assignor, by mesne assignments, to Daystrom, Incorporated, Murray Hill, N.J., a corporation of New Jersey Application November 25, 1955, Serial No. 548,892

3 Claims. (Cl. 324—154)

This invention relates to electrical instruments, and, more particularly, to an improved locking means for securing the instrument pointer to the pivot base which locking means also serves as an abutment for the instrument hair spring.

Instruments of the class to which this invention relates may comprise a permanent magnet spaced from a soft-iron yoke to form a magnetic flux gap. A wire-wound movable coil is pivotally mounted for rotation in the flux gap in response to current conducted to the coil through spiral hair springs. A pointer is secured to the movable coil and moves over a scale calibrated in values which are related to the magnitude of the current flowing through the movable coil. In a conventional instrument of this class, pivot bases are secured to opposite sides of the movable coil, such pivot bases being provided with suitable bores for retaining the axially-aligned pivots, the latter operating in jewel bearings. One of the pivot bases has secured thereto the instrument pointer and one or both pivot bases have also secured thereto an abutment to which is soldered the associated spiral hair spring. Heretofore, the pointer and the abutments have been secured to the pivot bases by means of nuts operating on the externally threaded shank portion of the pivot base. These nuts are difficult and costly to manufacture and, therefore, it is desirable to provide some relatively low cost substitute for such nuts, which substitute will also eliminate the necessity for threading the pivot base. I accomplish these desirable results by providing a self-locking type of terminal which not only secures the pointer to the base but which also serves as the spring abutment.

An object of this invention is the provision of an electrical instrument of the contemplated class having a movable coil and a pointer and in which the construction is such that no pivot-base nut is used.

An object of this invention is the provision of an electrical instrument having a pointer and wherein the pointer is secured to a pivot base by self-locking means which also serves as an abutment for the instrument hair spring.

An object of this invention is the provision of a nut-substitute for attachment to the pivot base of an electrical instrument and in which the inner terminal, or abutment, for a control hair spring is incorporated therein, in order to avoid making such a terminal as a separate part.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views.

Figure 1:
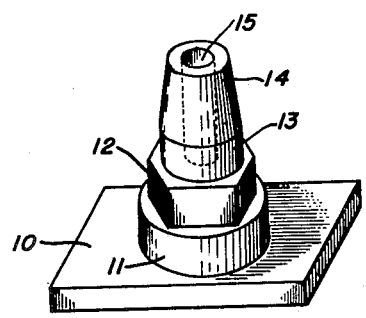
Figure 1 is a perspective view of a modified pivot base for an electrical instrument.

The construction of the pivot base for use with my novel pointer-securing device is shown in Figure 1. It comprises a flat base portion 10 and an upstanding shank consisting of the cylindrical pedestal portion 11, a non-circular portion 12 (which may be hexagonal as shown) and the reduced-diameter cylindrical portion 13 which terminates in a co-axially tapered or frusto-conical portion 14. An axial bore 15, into which a pivot may be force-fitted is formed in the free end of the shank.

Figure 2:
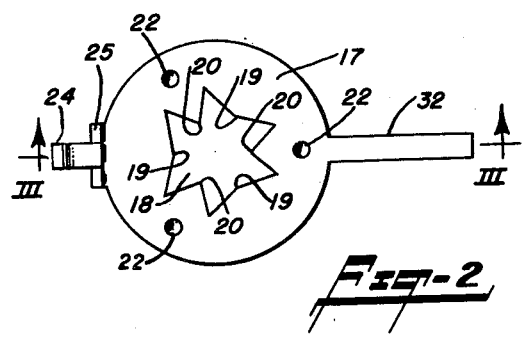
Figure 2 is a plan of the pointer-securing means, or combination nut-substitute and inner spring abutment, embodying the invention.
Figure 3:
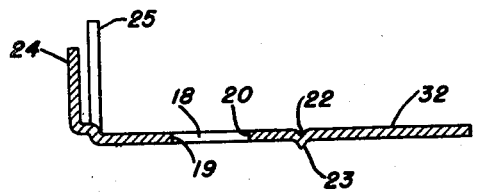
Figure 3 is a vertical sectional view on the line III—III of Figure 2, in the direction of the arrows.

The combination pointer-securing device and spring abutment is shown in Figures 2 and 3. Such device is formed from a flat strip of spring material, such as Phosphor bronze. The central portion or hub 17 has a non-circular aperture 18 formed therein, the aperture being defined by coplanar triangular portions or prongs having two sets of points identified by the numerals 19, 20. The blunt or obtuse-angled points 19 serve to position the device during press mounting thereof on the pivot base whereas the sharper, acute-angled points 20 suffer a slight amount of bending and, therefore, bite into the cylindrical portion of the pivot base. In other words, the inner ends of the points 19 lie on the circumference of a circle having a diameter slightly larger than the diameter of the pivot base portion 13, whereas the inner ends of the points 20 lie on the circumference of a circle having a diameter corresponding to that of upper end of the tapered pivot base portion 14. The hub portion of the device also is provided with a plurality of dimples as indicated at 22 so as to form relatively-sharp depending bosses 23. Extending from one side of the hub 17 is an upstanding arm that is slotted and offset to provide the bifurcations 24, 25 adapted to accommodate the inner end of the instrument hair spring.

Figure 4:
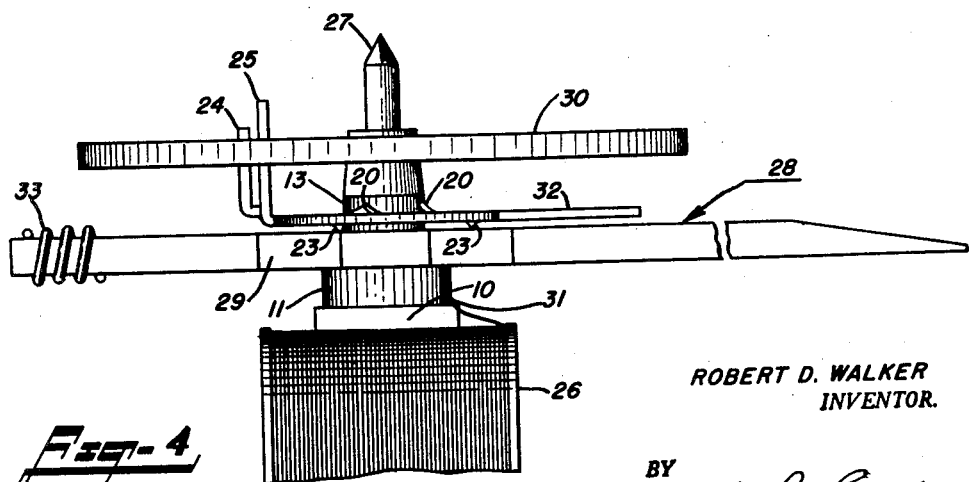
Figure 4 is an elevational view showing the pivot base secured to the movable coil with the pointer, pivot, spring and locking member assembled thereon.

Reference is now made to Figure 4 showing the upper portion of a wire wound movable coil 26. The pivot base, carrying the pivot 27, is secured to the surface of the movable coil by means of a suitable cement applied to the bottom of the pivot base portion 10. A more or less conventional pointer 28 includes a hub portion 29 having formed therein a non-circular hole corresponding to the pivot base portion 12, see Figure 1. Thus, when the pointer is assembled on the pivot base its hub section will rest upon the pedestal portion 11 of the pivot base and relative rotation between the pointer and the pivot base is prevented by the non-circular character of the pivot base portion 12 disposed in a matching aperture formed in the pointer hub. The pointer-securing device is then forced down over the shank of the pivot base to the position shown in the drawing. This may be done by means of suitable fixtures and a hand-operated press. The points 20, of the locking device are deformed upwardly and bite into the pivot base portion 13 thereby securing the pointer against axial displacement and the sharp bosses 23 bite into the upper surface of the pointer hub thereby preventing relative rotation between the pointer-securing device and the pivot base. It is here pointed out that the aperture in the pointer hub and the pivot shank portion 12 may each be of circular configuration. In such arrangement, relative rotation between the pointer and the clamping member is prevented by the bosses 23 which bite into surface of the pointer when the clamping member is forced into final position along the shank of the pivot base.

The inner end of the spiral hair spring 30 is placed between the bifurcations 24, 25. These bifurcations may then be pressed together with suitable pliers after which solder is applied to provide a permanent, good electrical joint. Those skilled in this art will understand that one end of the movable coil wire may be soldered to the pivot base, as indicated at 31 thereby establishing an electrical connection between one end of the movable coil and the hair spring. Generally, the assembled movable system is balanced by means of suitable balance weights carried by the tail and arms of the pointer, only the tail weight 33 being shown in the drawing. In order not to unduly unbalance the system the pointer-securing device includes an integral arm 32 that counterbalances the bifurcated end to which the hair spring is attached.

From the above description it is apparent that the pointer securing device constitutes a simple means for securing the pointer to a pivot base without the need of threading the pivot base and that such device also constitutes the abutment to which is secured the inner end of the spiral hair spring.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An arrangement for securing a pointer and a hair spring to the movable element of an electrical instrument, said arrangement comprising a pivot base secured to the movable element, said pivot base having a pedestal portion supporting the pointer, a non-circular portion extending into a similar non-circular aperture formed in the pointer and a shank having a tapered end; a member having diametrically-opposed arms extending from a hub portion provided with an aperture defined by a plurality of inwardly directed prongs, one of the hub arms being offset and terminating in a bifurcated end receiving an end of the hair spring, and certain of the said prongs having tips lying on the circumference of a circle having a diameter that is less than the maximum diameter of the pivot base shank, the arrangement being such that the tips of the said certain prongs bite into the pivot base shank when the member is forced over the shank and into contact with the surface of the pointer.

2. The invention as recited in claim 1, wherein the hub of the said member includes detents which are forced into the surface of the pointer when said member is forced to its maximum extent on the pivot base.

3. A spring abutment and pointer-securing device, comprising a unitary member constructed of flat spring material and having a generally circular body portion with an arm extending from its plane and bifurcated to receive the end of a spring, a balancing extension diametrically opposite the arm, said body portion having a central aperture defined by a plurality of prongs lying in the plane thereof, certain of said prongs being equally spaced, having obtuse-angled points and lying at a relatively large radius and alternating with an equal number of prongs having acute-angled points and lying at a smaller radius, whereby upon application to an upstanding cylindrical pointer pivot base shank of a radius corresponding with the relatively large radius of the obtuse-angled points, the latter serve to center the device on said shank, while the acute-angled points are uniformly deflected into biting engagement with said shank to thereby prevent removal therefrom and rotation therebetween, and a plurality of sharp bosses circumferentially arranged around the periphery of said body portion for biting engagement with an associated pointer to prevent relative rotation thereof.

References Cited in the file of this patent
UNITED STATES PATENTS

| | | |
|---|---|---|
| 896,695 | Harvey | Aug. 18, 1908 |
| 941,906 | Beardsley | Nov. 30, 1909 |
| 1,708,900 | Roller | Apr. 9, 1929 |
| 1,764,363 | Stalder | June 17, 1930 |
| 2,712,262 | Knohl | July 5, 1955 |

FOREIGN PATENTS

| | | |
|---|---|---|
| 597,243 | Great Britain | Jan. 21, 1948 |